May 18, 1954     E. J. OTTO     2,678,567
EXPANSIBLE SHEAVE LUBRICATING SYSTEM
Filed March 29, 1951     4 Sheets-Sheet 1

Inventor
Eugene J. Otto
by Wayne B. Easton
Attorney

May 18, 1954   E. J. OTTO   2,678,567
EXPANSIBLE SHEAVE LUBRICATING SYSTEM
Filed March 29, 1951   4 Sheets-Sheet 2

Inventor
Eugene J. Otto
by Wayne B. Easton
Attorney

May 18, 1954     E. J. OTTO     2,678,567
EXPANSIBLE SHEAVE LUBRICATING SYSTEM

Filed March 29, 1951     4 Sheets-Sheet 3

Inventor
Eugene J. Otto
by Wayne B. Easton
Attorneys

May 18, 1954  E. J. OTTO  2,678,567
EXPANSIBLE SHEAVE LUBRICATING SYSTEM
Filed March 29, 1951  4 Sheets-Sheet 4

Inventor
Eugene J. Otto
by Wayne B. Easton
Attorney

Patented May 18, 1954

2,678,567

UNITED STATES PATENT OFFICE 2,678,567

EXPANSIBLE SHEAVE LUBRICATING SYSTEM

Eugene J. Otto, Milwaukee, Wis., assignor to Allis-Chalmers Manufacturing Company, Milwaukee, Wis.

Application March 29, 1951, Serial No. 218,157

12 Claims. (Cl. 74—230.17)

This invention relates to the lubrication of mechanical elements and more particularly to the lubrication of limited areas of a cylindrical bearing surface having contact with segmental lugs rather than with full cylindrical bearing surfaces.

Particularly in the art of expansible sheaves of the sliding cone type such as are used with edge driving belts of the trapezoidal or V-belt type and in friction gearing of various types, it has been found desirable to mount frusto-conical faced flanges on cylindrical power transmission elements through use of flange supporting lugs of arcuate form circumferentially spaced to interdigitate with similar lugs on other relatively movable flanges of similar construction. Such a sheave is illustrated, for example, in the applicant's U. S. Patent No. 2,610,516, filed May 14, 1949, for a Spring Loaded Variable Diameter Sheave and Drive. Owing to the fact that there is almost unavoidably a substantial clearance between such interdigitating segmental lugs, considerable leakage of lubricant from the sliding bearings has been experienced, and poor lubrication has resulted from ordinary lubrication methods previously employed.

The object of the present invention is to devise a novel improved bearing lubricating arrangement for sliding bearings between spaced arcuate lugs of limited area and a cylindrical element surface which will substantially eliminate leakage and yet be practical from a manufacturing and operating point of view.

The following is a full, clear and concise description of three modes of the invention devised by the inventor for carrying his object into practical effect. Reference is made to the accompanying drawing, in which.

Figure 1:
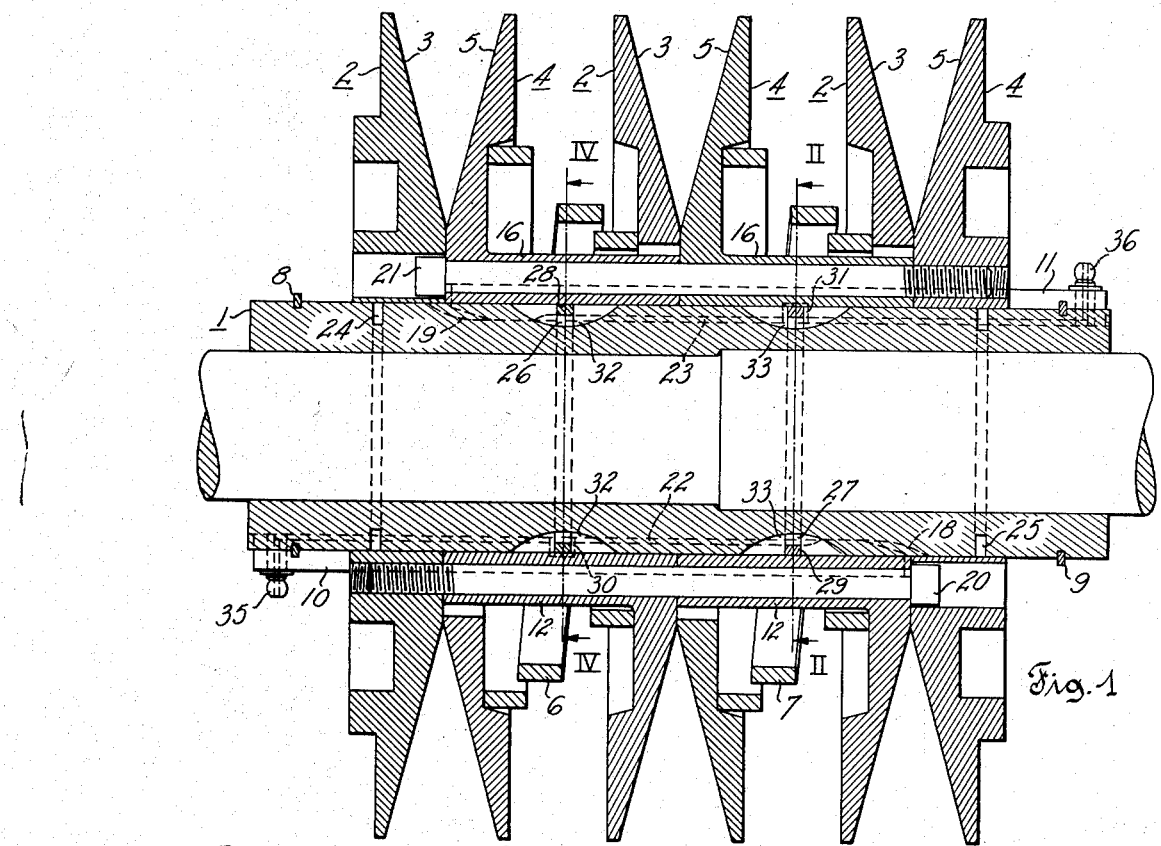
Fig. 1 is a longitudinal sectional view of one embodiment of a sheave embodying the invention.
Figure 2:
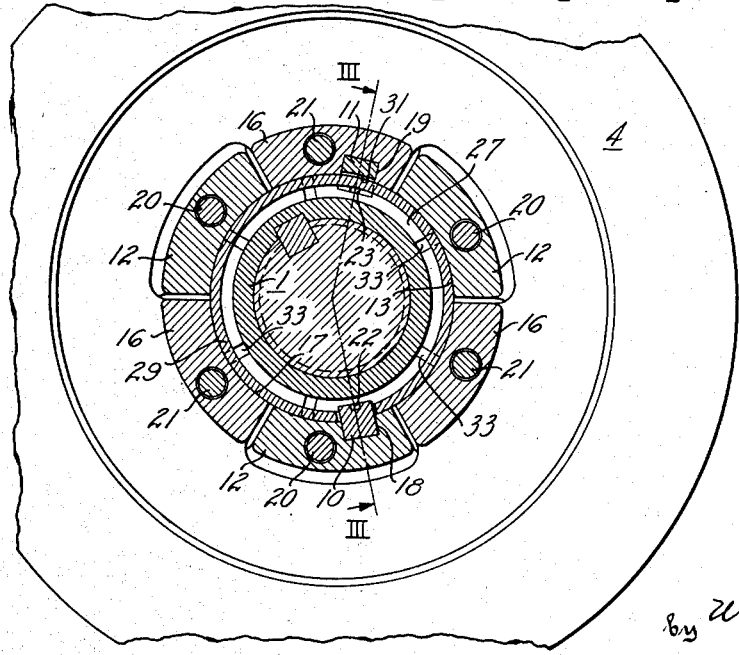
Fig. 2 is a fragmentary cross sectional view taken on line II—II of Fig. 1.
Figure 3:
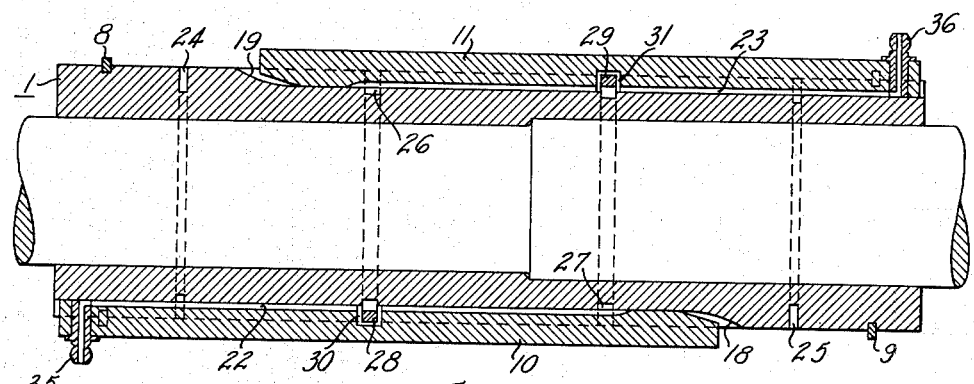
Fig. 3 is a fragmentary longitudinal sectional view taken on line III—III of Fig. 2.
Figure 4:
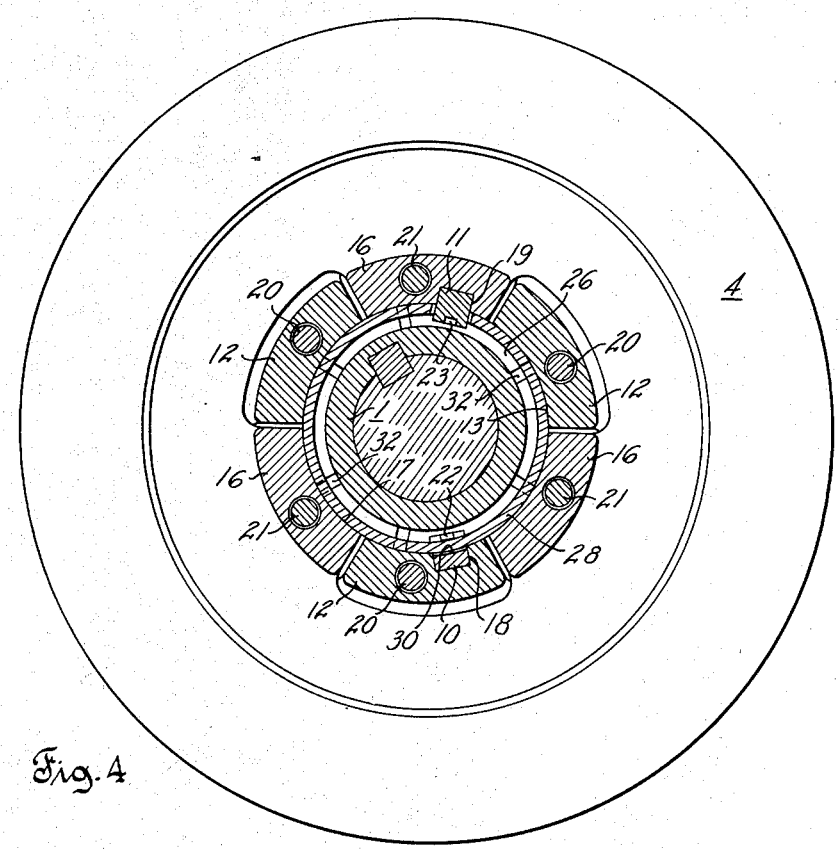
Fig. 4 is a cross sectional view taken on the line IV—IV of Fig. 1.

Still further objects and many specific advantages will be apparent from a reading of the following description.

Each of the three modes of the present invention is embodied in a "multiple grooved" variable pitch diameter or expansible sheave or pulley, as illustrated in the drawings, for use in a multiple speed V-belt drive. The principle features and operation of such sheave are fully illustrated and described in applicant's U. S. Patent No. 2,610,516, filed May 14, 1949, and will not be described in detail in this application. In the description of this invention, it will suffice to state that in the first embodiment (Figs. 1 to 4) a sleeve element 1 constitutes an externally cylindrical power transmission element which is arranged for mounting upon a rotary shaft. Upon this sleeve 1 are mounted a group of similarly facing sheave flanges 2 with frusto-conical faces 3 and a second group of similarly facing sheave flanges 4 with frusto-conical faces 5, the two groups facing oppositely, relative to each other. The two groups of flanges are relatively movable axially of the sleeve and are alternately arranged to form cooperating pairs of oppositely facing flanges with opposed frusto-conical faces 3 and 5, the faces being movable toward and away from each other to expand and contract the effective pitch diameter of the pulley with reference to a given size of V-belt or other interposed frictional drive element (not shown). Suitable means such as springs 6 and 7 and snap rings 8 and 9 are provided to limit relative axial movement of the flanges on the sleeve; and keys 10 and 11, further described hereinafter, are provided to prevent relative rotation between the sleeve 1 and the flanges 2 and 4.

Certain of the flanges 2 are formed with arcuate bearing axially extending lugs 12 which are circumferentially spaced forming an annular series; and the inner arcuate surfaces 13 of these lugs fit the cylindrical external surface of sleeve element 1 in axially slidable relation. Each flange 2 having such lugs 12 is apertured between such lugs to a larger diameter than the diameter of the bearing surfaces 13 of the lugs.

Certain of flanges 4 are formed with lugs 16, similar to lugs 12 and have similar bearing surface 17, and each of these flanges 4 is apertured to a larger diameter between the lugs than the diameter of bearing surfaces 17, and in assembly each set of lugs is interdigitated and passes through the apertures between the other set of lugs. One lug 12 has a longitudinal keyway 18 cooperating with key 10 to prevent rotation relative to sleeve element 1; one lug 16 similarly has a longitudinal keyway 19 for receiving key 11. Suitable tie bolts 20 and 21 are passed through suitable holes in the flanges and lugs of their respective sets and serve to fix the relative axial position of each flange in a set relative to the others so that the two sets are movable as units relative to each other, axially of the sleeve element 1, the lugs serving as spacer struts between the individual flanges of a set.

The lugs 12 and 16 are so proportioned as to axial length and the snap rings 8 and 9 are so positioned axially of the sleeve 1 that the flanges and their lugs can only move axially through a distance substantially less than the lug length. Thus, certain points or circumferentially spaced areas on the external cylindrical surface of sleeve 1 will normally be covered by the inner arcuate bearing surfaces of the lugs.

In order to provide means to lubricate the bearings between the arcuate bearing surfaces 13 and 17 of the lugs so as to permit freedom for limited axial movement of the flanges, this invention makes use of the key seats 18 and 19 and keys 10 and 11 to provide practical longitudinal lubricant passages 22, 23 through which to move lubricant to the areas to be lubricated. Passages 22 and 23 are preferably formed by grooving the bottoms of the keys 10 and 11 as shown, but may if desired be formed by grooving the key seats 18 and 19, the object in either case being to form passages 22 and 23 so that they are in effect within the body of sleeve element 1 and have no outlet to the external cylindrical surface except in selected areas.

Lubricant can be fed to a full cylindrical bearing, such as that between an end disk 2 and end disk 4 which have no lugs, by providing circumferential grooves 24 and 25, normally sealed around the full circumference by the cylindrical inner bearing surface of such end disks. However, if this were done in the axial vicinity of the bearings of lugs 12 and 16 on the sleeve, lubricant could escape freely between the lugs, where relatively large clearance is desirable.

The means by which lubricant is distributed to the lug bearing surface will be described hereinafter. Circumferential grooves 26 and 27 are formed in the external sleeve surface and communicate with or intersect the key seats 18 and 19 and lubricant passages 22 and 23. Grooves 26 and 27 are provided with rings 28 and 29, respectively, which fit the sides of the grooves closely and have a minimum outside diameter substantially equal to that of the external or bearing surface of sleeve element 1. Preferably such a ring will, like a piston ring, be split to provide a gap at one point large enough to permit passage of one of the keys 10 and 11, the other key being recessed to provide passage for the ring as shown at 30 and 31. Such rings 28 and 29 form outer walls for circumferential grooves 26 and 27, respectively.

To distribute lubricant to the lug bearing areas, auxiliary or branch lubricant pockets 32 and 33 communicating with the circumferential passages in grooves 26 and 27 are formed in sleeve 1 as by milling narrow longitudinal slots across the grooves at circumferentially spaced points or areas normally covered by the lugs. That is, at the centers of the normal lug bearing areas, points or circumferentially spaced areas normally covered by a lug bearing surface 13 or 17, openings or pockets are provided, as at 32 and 33, through the external cylindrical surface of sleeve 1 to provide for supply of lubricant from the circumferential passages formed by grooves 26 and 27, the passages being outwardly sealed at all other points by rings 28 and 29.

The rings 28 and 29 seal the passages within grooves 26 and 27, except at auxiliary passages or pockets 32 and 33, and thus prevent escape of lubricant between lugs 12 and 16.

Grease, oil or other lubricant supply fittings of known type are provided at 35 and 36, opening into the passages 22 and 23 defined by the formation of keys 10 and 11 and their key seats below the cylindrical external surface of the sleeve. The keys prevent escape of lubricant except at the desired areas where applicant has provided the distributing grooves and auxiliary passages described hereinabove. The lubricant forced in under pressure through either fitting 35 or fitting 36 will travel through all the above described passages to the points where lubrication is desired without waste or diversion through any unnecessary opening and will adequately lubricate all moving parts of the sheave without waste.

Figure 5:
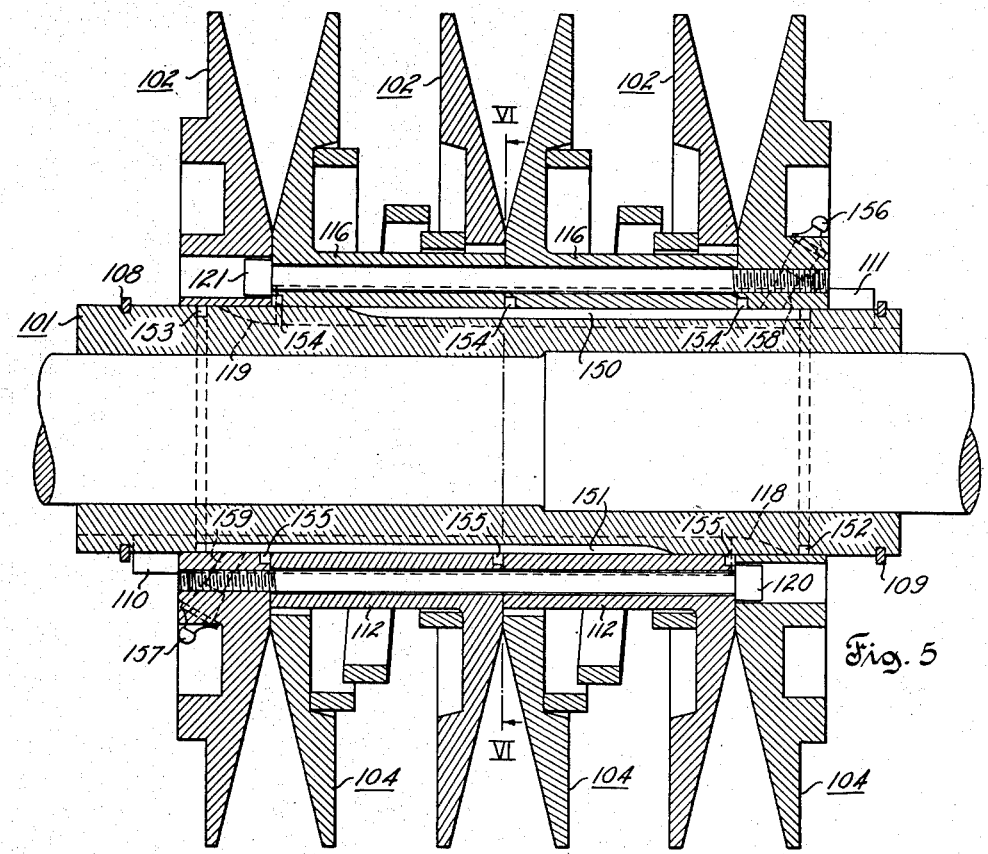
Fig. 5 is a longitudinal sectional view of a second embodiment of a sheave embodying the invention.
Figure 6:
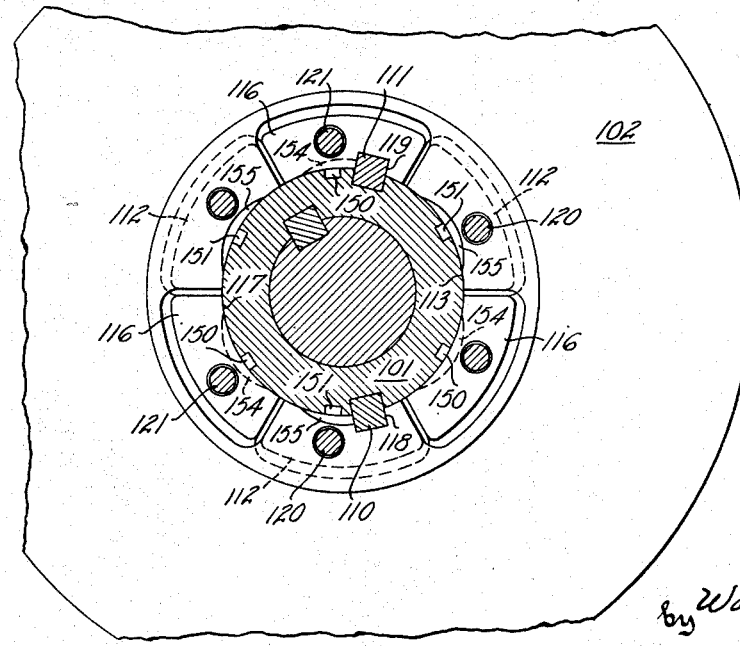
Fig. 6 is a fragmentary cross sectional view taken on line VI—VI of Fig. 5.

In the second embodiment of the invention (Figs. 5 and 6) a sleeve element 101 constitutes an externally cylindrical power transmission element which is adapted for mounting upon a rotary shaft. Upon this sleeve 101 are mounted a group of similarly facing sheave flanges 102 and a second group of oppositely facing flanges 104, the two groups being relatively movable axially of the sleeve and being alternately arranged to form cooperating pairs, movable toward and away from each other to expand and contract the effective pitch diameter of the pulley. Suitable means such as snap rings 108 and 109 are provided to limit relative axial movement of the flanges on the sleeve. Keys 110 and 111 prevent relative rotation between the sleeve 101 and the flanges 102 and 104.

Certain of the flanges 102 are formed with arcuate bearing lugs 112 which are circumferentially spaced forming an annular series; and the inner arcuate surfaces 113 of these lugs fit the cylindrical external surface of sleeve element 101 in axially slidable relation. Each flange 102 having such lugs 112 is apertured between such lugs to a larger diameter than the diameter of the bearing surfaces 113 of the lugs. Certain of flanges 104 are formed with lugs 116, similar to lugs 112 and having similar bearing surfaces 117, and in assembly each set of lugs is interdigitated and passes through the apertures between the other set of lugs. One lug 112 has a longitudinal keyway 118 fitting key 110 to prevent rotation relative to sleeve 101; one lug 116 similarly has a longitudinal keyway 119 fitting key 111. Suitable tie bolts 120 and 121 are passed through suitable holes in the flanges and lugs of their respective sets.

As in the first described embodiment of the invention, lugs 112 and 116 are so proportioned as to axial length and the snap rings 108 and 109 are so positioned axially of the sleeve 101 that the flanges and their lugs can only move axially through a distance somewhat less than the lug length. Thus, certain circumferentially spaced points or areas on the external cylindrical surface of sleeve 101 will normally be covered by the inner arcuate bearing surfaces of the lugs.

The structure thus far described for the second embodiment of the invention is the same as for the first embodiment. The second embodiment comprises a different mode of lubrication, however, and is further described hereinbelow.

In order to provide lubricating means to permit freedom for limited axial movement of the flanges 102 and 104 relative to sleeve 101, there is provided in the surface of sleeve 101 two groups of longitudinal lubricant passages 150 and 151 through which lubricant can be conveyed to the areas to be lubricated. Passages 150 are positioned in circumferentially spaced areas normally covered by lugs 116 and extend longitudinally to the area normally covered by the full cylindrical bearing of end disk 104; passages 151 are located in circumferentially spaced areas normally covered by lugs 112 and extend longitudinally to the area normally covered by the full cylindrical bearing of end disk 102.

All of the passages 150 intersect an annular header groove positioned between the external cylindrical surface of sleeve 101 and the internal bearing surface of end disk 104; such header groove is herein shown as a circumferential groove 152 provided in the surface of sleeve 101 and positioned in the area normally covered by the full cylindrical bearing of end disk 104. In similar manner, passages 151 intersect header groove 153 provided in the surface of sleeve 101.

To distribute lubricant to the lug bearing areas, auxiliary or branch lubricant pockets or circumferentially disposed slots 154 and 155, communicating respectively with longitudinal passages 150 and 151, are formed in lug bearing surfaces 117 and 113 and in inner bearing surfaces of end disks 104 and 102. Passages 154 and 155 may be formed as by milling narrow slots transverse to passages 150 and 151. When flanges 102 and 104 move relative to sleeve 101, the lubricant present in passages 154 and 155 is wiped over a considerable area of the external surface of sleeve 101.

Means for introducing lubricant into the above described lubricating system is provided for each group of passages 150 and 151. Grease, oil or other lubricant supply fittings of known type are provided at 156 and 157 for passages 158 and 159 in end disks 104 and 102. Passage 158 communicates with one of the longitudinal passages 150 and passage 159 communicates with one of the longitudinal passages 151. Lubricant forced in under pressure through fittings 156 and 157 will travel through all the above described passages to slots 154 and 155, where lubrication is desired, without encountering any unnecessary openings in transit thereto.

Figure 7:
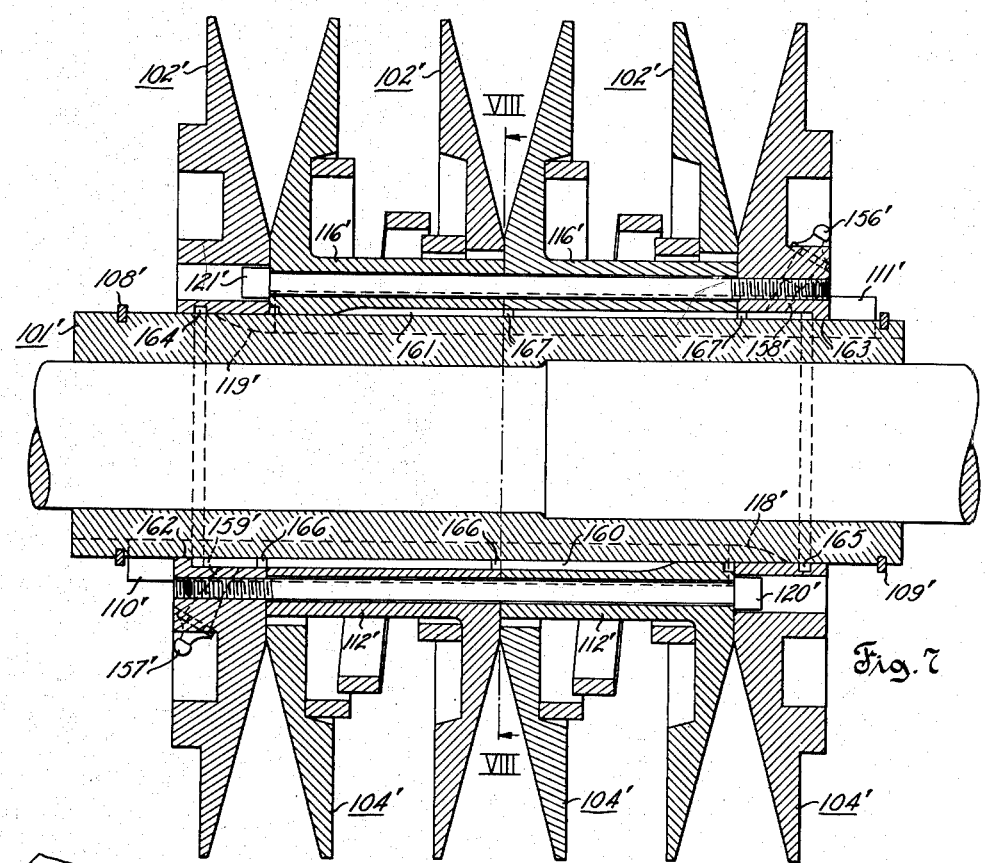
Fig. 7 is a longitudinal sectional view of a third embodiment of a sheave embodying the invention.
Figure 8:
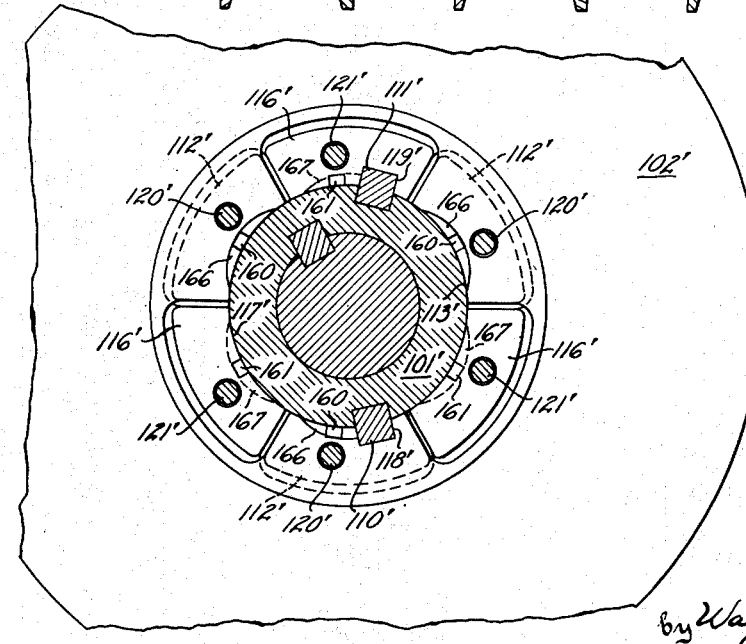
Fig. 8 is a fragmentary cross sectional view taken on line VIII—VIII of Fig. 7.

In the third embodiment of the invention (Figs. 7 and 8) a sleeve element 101' constitutes an externally cylindrical power transmission element which is arranged for mounting upon a rotary shaft. Upon this sleeve 101' are mounted a group of similarly facing sheave flanges 102' and a second group of oppositely facing flanges 104', the two groups being relatively movable axially of the sleeve and being alternately arranged to form cooperating pairs, movable toward and away from each other to expand and contract the effective pitch diameter of the pulley. In this embodiment, as distinguished from the two embodiments shown in Figs. 1 to 6, snap rings 108' and 109' are provided only to prevent flanges 102' and 104' from sliding off sleeve 101' and not to limit such axial movement of the flanges to a predetermined amount. Keys 110' and 111' prevent relative rotation between the sleeve 101' and the flanges 102' and 104'.

Certain of the flanges 102' are formed with arcuate bearing lugs 112' which are circumferentially spaced forming an annular series; and the inner arcuate surfaces 113' of these lugs fit the cylindrical external surface of sleeve element 101' in axially slidable relation. Each flange 102' having such lugs 112' is apertured between such lugs to a larger diameter than the diameter of the bearing surfaces 113' of the lugs. Certain of flanges 104' are formed with lugs 116', similar to lugs 112' and having similar bearing surfaces 117', and in assembly each set of lugs is interdigitated and passes through the apertures between the other set of lugs. One lug 112' has a longitudinal keyway 118' fitting key 110' to prevent rotation relative to sleeve 101'; one lug 116' similarly has a longitudinal keyway 119' fitting key 111'. Suitable tie bolts 120' and 121' are passed through suitable holes in the flanges and lugs of their respective sets.

In order to provide lubricating means which will afford free axial movement of the flanges 102' and 104' relative to sleeve 101', there is respectively provided in the surfaces 113' and 117' of lugs 112' and 116' two groups of longitudinal lubricant passages 160 and 161 through which lubricant can be conveyed to the areas to be lubricated. Longitudinal extensions of passages 160 are provided in the full cylindrical bearing surface 162 of end disk 102' and longitudinal extensions of passages 161 are provided in the full cylindrical bearing surface 163 of end disk 104'.

All of the passages 160 intersect an annular header groove positioned between the external cylindrical surface of sleeve 101' and the internal bearing surface 162 of end disk 102'; such header groove is herein shown as a circumferential groove 164 provided in the surface 162 of end disk 102'. In similar manner, passages 161 intersect header groove 165 provided in surface 163 of end disk 104'. Although not shown, header grooves 164 and 165 may be provided in sleeve 101' axially within areas normally covered by the bearing surfaces 162 and 163 of end disks 102' and 104' respectively.

To distribute lubricant to the lug bearing areas, auxiliary or branch lubricant pockets or slots 166 and 167, communicating respectively with longitudinal passages 160 and 161, are formed in lug bearing surfaces 113' and 117' and in inner bearing surfaces of end disks 102' and 104'. Passages 166 and 167 may be formed as by milling narrow slots transverse to passages 160 and 161. When flanges 102' and 104' move relative to sleeve 101', the lubricant present in passages 160 and 161 is wiped over a considerable area of the external surface of sleeve 101'. Although not shown, it is within the scope of the present invention, as an alternative, to mill slots similar to 166 and 167 in the external surface of sleeve 101' in intersecting relation with passages 160 and 161.

Means for introducing lubricant into the above described system is provided for each group of passages 160 and 161. Grease, oil or other lubricant supply fittings of known type are provided at 156' and 157' for passages 158' and 159' in end disks 104' and 102'. Passage 158' communicates with one of the longitudinal passages 161 and passage 159 communicates with one of the longitudinal passages 160. Lubricant forced in under pressure through fittings 156' and 157' will travel through all the above described passages to slots 166 and 167, where lubrication is desired, without encountering any unnecessary openings in transit thereto.

It will be understood that the details of the three embodiments of the sheave structure described hereinabove and illustrated in the drawings are by way of example only and that the lubricating systems will be capable of beneficial use in mechanisms other than sheaves. It will also be understood that modifications of details and substitutions of substantial equivalents may be made without departing from the spirit and teaching hereof and that the invention is accordingly intended to include whatever lies within the legitimate scope of the appended claims.

It is claimed and desired to secure by Letters Patent:

1. In an expansible sheave of the axially movable cone type, the combination comprising: an externally cylindrical surfaced rotary power transmission element; first and second sets of relatively movable frusto-conical faced flanges, said first set comprising a plurality of flanges mounted on said element in alternating relation with flanges of said second set, said first set having at least one lugged flange with an annular series of circumferentially spaced internally cylindrical surfaced arcuate bearing lugs engaging said cylindrical surface of said element in axially slidable flange supporting relation and an internally cylindrical surfaced end flange engaging said cylindrical surface of said element in axially slidable flange supporting relation; means normally limiting axial relative movement of said first set of flanges on said element; a plurality of generally longitudinal lubricant passages in said cylindrical surface of said element each located circumferentially and extending axially within the area of said cylindrical surface of said element normally covered by said internal cylindrical surface of one of the lugs of each lugged flange of said first set and the said internal cylindrical surface of said end flange of said first set; means for supplying lubricant to said longitudinal passages; a generally annular lubricant passage between said cylindrical surface of said element and said internal cylindrical surface of said end flange communicating with said longitudinal passages; and a plurality of lubricant pockets between said cylindrical surface of said element and said internal cylindrical surfaces of said lugs, communicating with said longitudinal passages.

2. The combination of claim 1 in which said means for supplying lubricant to said longitudinal passages comprises conduit means in at least one of said flanges communicating with at least one of said longitudinal passages.

3. The combination of claim 1 in which said means for supplying lubricant to said longitudinal passages comprises conduit means in said end flange communicating with at least one of said longitudinal passages.

4. The combination of claim 1 in which said generally annular lubricant passage is located circumferentially in said cylindrical surface of said element within the area normally covered by said internal cylindrical surface of said end flange.

5. The combination of claim 1 in which said generally annular lubricant passage is located in said cylindrical surface of said element within the total area normally covered by said internal cylindrical surface of said end flange and said internal cylindrical surfaces of said lugs.

6. The combination of claim 1 in which said plurality of lubricant pockets are located in said internally cylindrical surfaces of said lugs.

7. In an expansible sheave of the axially movable cone type, the combination comprising: an externally cylindrically surfaced rotary power transmission element; first and second sets of relatively movable frusto-conically faced flanges, said first set comprising a plurality of flanges mounted on said element in alternating relation with flanges of said second set, said first set having at least one lugged flange with an annular series of circumferentially spaced internally cylindrical surfaced arcuate bearing lugs engaging said cylindrical surface of said element in axially slidable flange supporting relation and an internally cylindrically surfaced end flange engaging said cylindrical surface of said element in axially slidable flange supporting relation; a plurality of generally longitudinal lubricant passages each located respectively in said internally cylindrical surface of one of said lugs of at least one of said lugged flanges and in said internal cylindrical surface of said end flange; means for supplying lubricant to said longitudinal passages; a generally annular lubricant passage between said cylindrical surface of said element and said internally cylindrical surface of said end flange communicating with said longitudinal passages; and a plurality of lubricant pockets between the bearing surface of said lugs and the surface of said element communicating with said longitudinal passages.

8. The combination of claim 7 in which said means for supplying lubricant to said longitudinal passages comprises conduit means in at least one of said flanges of said first set communicating with at least one of said longitudinal passages.

9. The combination of claim 7 in which said means for supplying lubricant to said longitudinal passages comprises conduit means in said end flange communicating with at least one of said longitudinal lubricant passages.

10. The combination of claim 7 in which said generally annular lubricant passage is located circumferentially in said internally cylindrical surface of said end flange.

11. The combination of claim 7 in which said plurality of lubricant pockets are located in said internally cylindrical surfaces of said lugs.

12. In an expansible sheave of the axially movable cone type, the combination comprising: a rotary power transmission element having a generally cylindrical external surface; first and second sets of relatively movable frusto-conically faced flanges, said first set comprising a plurality of flanges mounted on said element in alternating relation with said second set, said first set having at least one lugged flange with an annular series of circumferentially spaced lugs with bearing surface portions engaging said cylindrical surface of said element in axially slidable relation and an end flange with a full cylindrical bearing surface adjoining said bearing surfaces of said lugs and engaging said cylindrical surface of said element in axially slidable relation; a longitudinally extending lubricant passage associated with each of said lugs having a radially inward side defined by said element and a radially outward side defined jointly by one of said lugs and said end flange; a circumferential lubricant passage formed between said element and said end flange communicating with each of said longitudinally extending lubricant passages; and means for supplying a lubricant to one of said longitudinally extending lubricant passages.

References Cited in the file of this patent

UNITED STATES PATENTS

| Number | Name | Date |
|---|---|---|
| 2,107,483 | Knight | Feb. 8, 1938 |
| 2,524,575 | Shaw | Oct. 3, 1950 |
| 2,532,124 | Shaw | Nov. 28, 1950 |